United States Patent Office 3,370,627
Patented Feb. 27, 1968

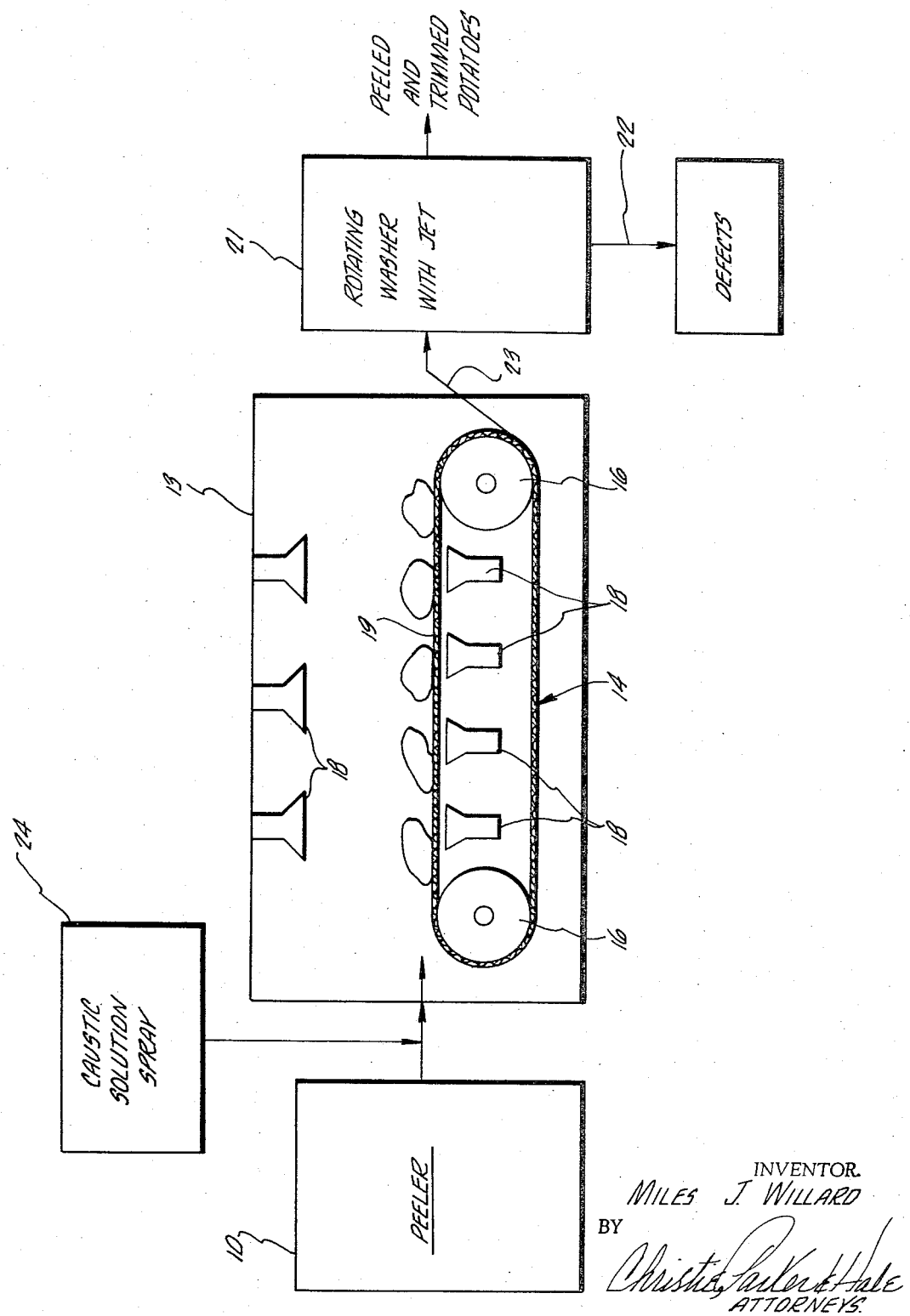

3,370,627
APPARATUS AND METHODS FOR PEELING
FRUITS AND VEGETABLES
Miles J. Willard, 3067 Gustafson Circle,
Idaho Falls, Idaho 83401
Filed Oct. 4, 1965, Ser. No. 492,691
10 Claims. (Cl. 146—232)

ABSTRACT OF THE DISCLOSURE

Apparatus and method for peeling a product such as fruits or vegetables and for removing defective portions by subjecting the product to radiant heat to raise the temperature of exterior portions of the product and to soften those portions. Peels and defective portions are thereafter removed from the product. The apparatus includes peeling and trimming apparatus having a peeler and a conveyer for transporting the product from the peeler to and through a radiant heater. An abrader is provided to remove defective portions of the product after it emerges from the radiant heater.

---

This invention relates to apparatus and methods for peeling fruits and vegetables.

Although this invention is applicable to the peeling of various types of fruits and vegetables, it is particularly useful in peeling and removing defects from potatoes and, therefore, is described with particular reference to that use.

One of the chief difficulties in potato processing is the tendency of the potatoes to form small blackened areas directly beneath the skin. These defects are caused by bruising, bacterial infection, etc. In all potato processing it is necessary to use an extensive "trim line" following the peeling operation. On the trim line, a number of workers manually remove, with knives, the objectionable defective portions of the potato or other product. The cost of trimming potatoes is particularly high in making frozen French fried potatoes because in these products all of the defective portions must be removed to meet Government standards.

This invention provides method and apparatus to reduce substantially the amount of manual-trimming labor required by treating the potatoes or other product so that the blackened, defective areas can be removed mechanically and automatically.

In terms of apparatus for peeling fruit or vegetable products, the invention includes a product peeler for removing the skins from the product and leaving exposed the defective portions on the peeled product surface. Means are provided for conveying the peeled product into a radiant heater where the darker, defective portions of the product are preferentially heated to a higher temperature than the other portions of the product so that the undefective portions of the product immediately adjacent the defective portions are partially cooked and softened. Thereafter, the peeled, radiant heat-treated product is subjected to abrading means to wear away the defective portions of the product.

Preferably, the radiant heater is enclosed to reduce evaporation of moisture from the surface of the peeled product during the heat treatment, and thereby prevent case hardening of the peeled potato product.

The preferred apparatus also includes means for coating the product with a layer of caustic solution which is on the product in the radiant heater. Under the influence of the radiant energy and increased temperature, the caustic solution is energized and promotes a relatively deep cooking at the point of the dark, defective portion to facilitate subsequent removal of the defective portion from the product.

In terms of method for removing a dark, defective portion from a product such as fruits or vegetables, the invention includes the steps of irradiating the product with radiant heat to raise the defective portion to a temperature higher than the surrounding portion of the product and thereby cause the undefective portion of the product immediately adjacent the defective portion to soften. Thereafter, the defective portion of the product is removed.

In the preferred method, the product is first coated with a layer of caustic solution and thereafter peeled before being subjected to the radiant heating step. Preferably, the product has a coating of caustic solution on it during radiant heating to promote deep cooking or softening of the product beneath the defective portion. Preferably, the heating is conducted in an enclosed atmosphere to retard evaporation, the relative humidity being maintained in the range of about sixty-five percent to one hundred percent.

After the product is subjected to radiant heating, it is then passed through a rotating washer where a high pressure jet of water abrades away the blackened and softened areas of the product which had been preferentially heated by the radiant energy.

These and other aspects of the invention will be more fully understood with the following detailed description and the accompanying schematic drawing of the presently preferred apparatus.

Referring to the drawing, a fruit or vegetable product, say, potatoes (not shown), is fed into a potato peeler 10 which may be any one of the several types in general use today. For example, the peeler may be an abrasion type in which the skin of the potatoes is removed with a roughened surface which scrapes the skin and potato flesh from the surface of the tuber. A stream of water is usually directed on the potatoes throughout the process to remove the loosened material. Alternatively, steam peeling is accomplished by passing the potatoes through a chamber maintained at about 300° F. to about 350° F. with high-pressure steam. The high-pressure steam cooks and softens the exterior tissue of the potato. The softening of the tissue is controlled to a shallow depth by limiting residence time of the potatoes in the steamer. After steaming, the potatoes are subjected to a stream of water, usually at high pressure, to sluff and abrade away the peeling and layer of cooked potato cells immediately underneath the peel. In caustic peeling, the potatoes are sprayed, flooded, or dipped in a ten to twenty percent water solution of sodium hydroxide in the temperature range between about 140° F. and 212° F. The combined chemical and heat action disintegrates the skin and potato flesh lying immediately below it, permitting the skin and disintegrated potato flesh to be washed off in a following water bath.

The peeled potatoes are carried from the peeler by a conventional conveyor 12 into an enclosed radiant heater chamber 13 and dumped on a generally elongated, horizontal endless wire mesh belt 14 disposed around rollers 16 which are driven by conventional means (not shown). The plurality of conventional infrared radiant heaters 18 are mounted in the radiant heater above and below the top loop 19 of the endless belt so that the potatoes are substantially, uniformly irradiated with radiant heat. Preferably, the potatoes are sprayed with a ten to twenty percent water solution of sodium hydroxide from a reservoir 24 after leaving the peeler so that they are coated with caustic in the heater. Even if the caustic solution is not used, the potatoes preferably have a layer of "free" water on their surfaces. The water is either carried over from the peeler and washing step or it is sprayed on before or as the potatoes enter the heater.

The darker, defective portions of the peeled potatoes absorb more radiant heat and are preferentially heated to a higher temperature than the white unblemished portions of the potato. The layer of caustic solution on and in the vicinity of the dark, defective portions is heated to an increased temperature and energized to promote deep cooking of the portion of the potato in the black area. This facilitates subsequent removal of the defective portions of the potatoes.

In most potato processes, it is desirable not to heat the potatoes any more than necessary. Therefore, the time of treatment is short enough so that the cooking of the outer surface of the unblemished part of the potato does not occur more than necessary to soften the portions of the potato in the vicinity of the defects. The degree and time of heating depends on the variety of the potatoes and their ultimate use. In general, a conventional radiant heater provides adequate heat in about four to about eight minutes to remove defective portions.

The process is further improved by preventing or retarding evaporation of water from the surface of the potato, which prevents case hardening of the potato surface. In this process, the enclosed radiant heater insures that the relative humidity of the atmosphere around the potatoes during the radiant heating step is kept in the range of about sixty-five percent to one hundred percent. The higher humidity is preferred for maximum protection against case hardening of the potato surface.

The heat-treated potatoes are carried from the heater by a conventional conveyer 20 into a standard rotating washer 21 where the potatoes are subjected to a high-pressure jet of water which abrades and wears away the dark, defective portions which have been preferentially heated by radiant energy. The defective portions are discarded through an outlet 22 and peeled, trimmed potatoes are carried out of the rotating washer on a conventional conveyer 23.

The defective portions of the heat-treated potatoes can also be removed by mechanical abrasions such as that provided by Carborundum rolls, brushes, or scouring elements as described in my copending application Ser. No. 403,623, now abandoned.

From the foregoing description, it will be seen that this invention provides for the removal of defective portions of potatoes and the like by preferentially heating the darker, defective portions with radiant heat. This preferential heating reduces the unnecessary heating of the unblemished part of the potato while providing the necessary softening of the portion of the potato around the defective areas to facilitate their removal mechanically and automatically, thereby eliminating or substantially reducing the amount of hand labor previously required to trim defective portions from peeled potatoes.

I claim:

1. Apparatus for peeling fruit or vegetable products and removing defective portions from them, the apparatus comprising a product peeler for removing the skins from the product and leaving exposed defective portions on the peeled product surface, a radiant heater, means for conveying the peeled product from the peeler to the heater where the defective portions of the product are preferentially heated to a higher temperature than the other portions of the product whereby the undefective portions of the product immediately adjacent the defective portions soften, and means for abrading away the defective portions of the product.

2. Apparatus for peeling fruit or vegetable products and removing defective portions from them, the apparatus comprising a product peeler for removing the skins from the product and leaving defective portions on the peeled product surface, a radiant heater, means for applying a layer of caustic solution to the peeled product, means for conveying the peeled product from the peeler to the heater where the defective portions of the product are preferentially heated to a higher temperature than the other portions of the product whereby the undefective portions of the product immediately adjacent the defective portions soften, and means for abrading away the defective portions of the product.

3. Apparatus for peeling fruit or vegetable products and removing defective portions from them, the apparatus comprising a product peeler for removing the skins from the product and leaving exposed defective portions on the peeled product surface, an enclosed radiant heater, means for conveying the peeled product from the peeler into the heater where the defective portions of the product are preferentially heated to a higher temperature than the other portions of the product whereby the undefective portions of the product immediately adjacent the defective portions soften, and means for abrading away the defective portions of the product.

4. Apparatus for peeling fruit or vegetable products and removing defective portions from them, the apparatus comprising a product peeler for removing the skins from the product and leaving exposed defective portions on the peeled product surface, a radiant heater, means for conveying the peeled product from the peeler to the heater where the defective portions of the product are preferentially heated to a higher temperature than the other portions of the product whereby the undefective portions of the product immediately adjacent the defective portions soften, and means for directing a jet of water against the product to abrade away the defective portions of the product.

5. A method for removing a defective portion from a product such as fruits or vegetables, the method comprising the steps of peeling skin from the product to expose the defective portions, irradiating the product with radiant heat to raise the defective portion to a temperature higher than the surrounding portion and thereby cause the undefective portion of the product immediately adjacent the defective portion to soften, and thereafter removing the defective portion from the product.

6. A method for removing a defective portion from a product such as fruits or vegetables, the method comprising the steps of peeling skin from the product, coating the peeled product with caustic solution, irradiating the product with radiant heat to raise the defective portion to a temperature higher than the surrounding portion and thereby activate the caustic solution and cause the undefective portion of the product immediately adjacent the defective portion to soften, and thereafter removing the defective portion from the product.

7. A method for removing a defective portion from a product such as fruits or vegetables, the method comprising the steps of irradiating the product with radiant heat to raise the defective portion to a temperature higher than the surrounding portion and thereby cause the undefective portion of the product immediately adjacent the defective portion to soften, retarding evaporation of moisture from the product during heating, and thereafter removing the defective portion from the product.

8. A method for removing a defective portion from a product such as fruits or vegetables, the method comprising the steps of irradiating the product with radiant heat to raise the defective portion to a temperature higher than the surrounding portion and thereby cause the undefective portion of the product immediately adjacent the defective portion to soften, maintaining a relative humidity between about sixty-five percent and one hundred percent in the atmosphere surrounding the product during heating to retard evaporation of moisture from the product, and thereafter removing the defective portion from the product.

9. A method for removing a defective portion from a product such as fruits or vegetables, the method comprising the steps of peeling skin from the product to expose the defective portion, coating the surface of the product with a layer of free water, irradiating the product with radiant heat in an enclosed chamber to raise the defective portion to a temperature higher than the surrounding portion and thereby cause the undefective portion of the product immediately adjacent the defective portion to soften, retarding the evaporation of water from the product during heating, and thereafter removing the defective portion from the product.

10. A method for removing a defective portion from a product such as fruits or vegetables, the method comprising the steps of peeling skin from the product to expose the defective portion, irradiating the product with radiant heat to raise the defective portion to a temperature higher than the surrounding portion and thereby cause the undefective portion of the product immediately adjacent the defective portion to soften, and thereafter directing a jet of water against the product to abrade away the defective portion from the product.

References Cited
UNITED STATES PATENTS

| | | | |
|---|---|---|---|
| 719,617 | 2/1903 | Scovill | 146—46 |
| 2,498,949 | 2/1950 | Forrest | 146—232 |
| 2,781,070 | 2/1957 | Kilburn et al. | 146—47 |
| 3,115,176 | 12/1963 | Walker | 146—241 X |

W. GRAYDON ABERCROMBIE, *Primary Examiner.*